US006847971B1

(12) United States Patent
Balaraman et al.

(10) Patent No.: US 6,847,971 B1
(45) Date of Patent: Jan. 25, 2005

(54) LIGHTWEIGHT DATA REPLICATION

(75) Inventors: Sukanya Balaraman, Fremont, CA (US); Alan Robert Downing, Fremont, CA (US); John C. Graham, Palo Alto, CA (US); Lewis S. Kaplan, Los Angeles, CA (US); Benny Souder, Belmont, CA (US); Harry Sun, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/321,622

(22) Filed: May 28, 1999

Related U.S. Application Data

(60) Provisional application No. 60/086,985, filed on May 28, 1998.

(51) Int. Cl.[7] .............................................. G06F 17/30
(52) U.S. Cl. .................. 707/101; 707/10; 707/204; 707/201; 709/232; 709/231; 709/248
(58) Field of Search ................... 707/101, 10, 201, 707/200, 202, 203, 204; 709/230, 232, 200, 203, 248, 231, 236

(56) References Cited

U.S. PATENT DOCUMENTS

| 4,631,673 | A | * | 12/1986 | Haas et al. | 707/100 |
| 5,737,601 | A | * | 4/1998 | Jain et al. | 707/201 |
| 5,806,075 | A | * | 9/1998 | Jain et al. | 707/201 |
| 5,963,959 | A | * | 10/1999 | Sun et al. | 707/200 |
| 5,995,980 | A | * | 11/1999 | Olson et al. | 707/201 |
| 5,999,936 | A | * | 12/1999 | Pattison et al. | 707/101 |
| 6,006,232 | A | * | 12/1999 | Lyons | 707/101 |
| 6,151,602 | A | * | 11/2000 | Hejlsberg et al. | 707/10 |

* cited by examiner

Primary Examiner—Srirama Channavajjala
Assistant Examiner—Khanh Pham
(74) Attorney, Agent, or Firm—Ditthavong & Carlson, P.C.

(57) ABSTRACT

A lightweight row transfer protocol is described that can be easily handled by thin clients, such as JAVA™ applications using CORBA. The lightweight row transfer protocol serves to reduce bandwidth requirements by applying compression techniques to reduce the number of column lengths in a "result set" of rows that are transmitted from one computer to another.

50 Claims, 7 Drawing Sheets

LIGHTWEIGHT DATA REPLICATION

RELATED APPLICATIONS

The present application claims the benefit of U.S. Provisional Application No. 60/086,985 entitled "Replication for Front Office Replication" filed on May 28, 1998 by Benny Souder, Alan Downing, Harry Sun, Alan Demers, James Stamos, John Graham, and Curtis Elsbernd, the contents of which are hereby incorporated by reference herein.

The present application is related to the following commonly-assigned U.S. patent applications, the contents of all of which in their entirety are hereby incorporated by reference herein:

- U.S. application Ser. No. 09/322,153 entitled "Data Replication for Front Office Automation" filed on May 28, 1999 by Benny Souder, Alan Downing, Harry Sun, Alan Demers, James Stamos, John C. Graham, Curtis Elsbernd, Mahesh Subramaniam, and Wayne E. Smith, now U.S. Pat. No. 6,532,479;
- U.S. application Ser. No. 09/321,622 entitled "Lightweight Data Replication" filed on May 28, 1999 by Sukanya Balaraman, Alan Downing, John C. Graham, Lewis S. Kaplan, Benny Souder, and Harry Sun, now pending;
- U.S. application Ser. No. 09/321,624 entitled "Data Replication Security" filed on same date herewith by Wayne E. Smith and Alan Downing, now pending;
- U.S. application Ser. No. 09/321,625 entitled "Mass Deployment of Front Office Applications" filed on May 28, 1999 by Curtis Elsbernd, Benny Souder, and Wayne E. Smith, now U.S. Pat. No. 6,529,904; and
- U.S. application Ser. No. 09/321,594 entitled "Schema Evolution in Replication" filed on May 28, 1999 by Alan Demers, Curtis Elsbernd, James Stamos, and Lik Wong, now pending.

FIELD OF THE INVENTION

The present invention relates to distributed database systems and more particularly to lightweight replication of data.

BACKGROUND OF THE INVENTION

Under certain conditions, it is desirable to maintain copies of a particular body of data, such as a relational database table, at multiple sites. The mechanism for maintaining multiple copies of the same body of data at multiple sites is generally referred to as "data replication." In a distributed database system using data replication, multiple replicas of data exist in more than one database in the distributed database system.

One kind of data replication employs snapshots. A snapshot is a body of data constructed of data from one or more "master" tables, views, or even other snapshots, any of which can be stored locally or remotely relative to the snapshot. The data contained within the snapshot is defined by a query that references one or more master tables (and/or other database objects) and reflects the state of its master tables at a particular point in time. To bring the snapshot up-to-date with respect to the master tables, the snapshot is refreshed upon request, e.g. at a user's command or automatically on a periodic, scheduled basis.

There are two basic approaches for refreshing a snapshot. "Complete refreshing" involves reissuing the defining query for the snapshot and replacing the previous snapshot with the results of the reissued query. "Incremental refresh" or "fast refresh" refers to identifying the changes that have happened to the master tables (typically, by examining a log file of the changes) and transferring only the data for the rows in the snapshot that have been affected by the master table changes. An "updatable snapshot" is a snapshot to which updates may be directly made, which are propagated from the snapshot back to the master table before refreshing.

Traditionally, snapshots have been implemented for high-end computer systems, which are characterized by the use of high performance computers that are interconnected to one another by highly reliable and high bandwidth network links. Typically, highly experienced database administrators manage these high-end systems. Due to the expense of these high-end computers, high-end distributed systems tend to involve a small number of networked sites, whose users can be trusted at least in part because of the physical security of the computers.

Recently, there has been much interest in the marketplace for applications for front office automation. One example is sales force automation, where hundreds, if not thousands, of sales representatives in a company are given laptops to improve their productivity. The laptops are loaded with applications, for example, to help a sales representative sell the company's products to a customer and take the customer's order. Therefore, the laptops include a data store to keep the customer and order information handy for use by a specific sales representative.

Front office automation, however, challenges the operating assumptions behind the high-end snapshot implementations. For example, high-end snapshot replication uses a full relational database system at each site to drive the snapshot refreshes, receive the row data in a SQL format, and apply the changes. Since laptops are computationally constrained, it is desirable to implement thin clients, for example JAVA™ applications, rather than requiring a full relational database system. However, the high-end row transfer mechanism employs a thick, SQL application programming interface (API).

SUMMARY OF THE INVENTION

There is a need for an implementation of snapshot replication that is suitable in a front office automation environment without incurring the above-described and other disadvantages incumbent in a high-end implement of snapshot replication.

This and other needs are addressed by the present invention which implements to a lightweight row transfer protocol that can be easily handled by thin clients, such as JAVA™ applications using CORBA. The lightweight row transfer protocol serves to reduce bandwidth requirements by applying compression techniques to reduce the number and size of column lengths in a "result set" of rows that are transmitted from one computer to another.

Accordingly, one aspect of the invention pertains to a computer-implemented method and a computer-readable medium bearing instructions for a method of transmitting data for multiple rows. The rows are encapsulated one or more result sets, and the result sets are transmitted. In one embodiment, the result sets contain column lengths corresponding to respective lengths of columns of data within the rows.

Another aspect of the invention relates to a computer-implemented method and a computer-readable medium bearing instructions for a method of receiving data multiple rows. In one embodiment, one or more result sets are received that contain column lengths corresponding to respective lengths of columns of data within the rows and are unpacked into the data for the rows.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, article, and apparatus for lightweight replication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
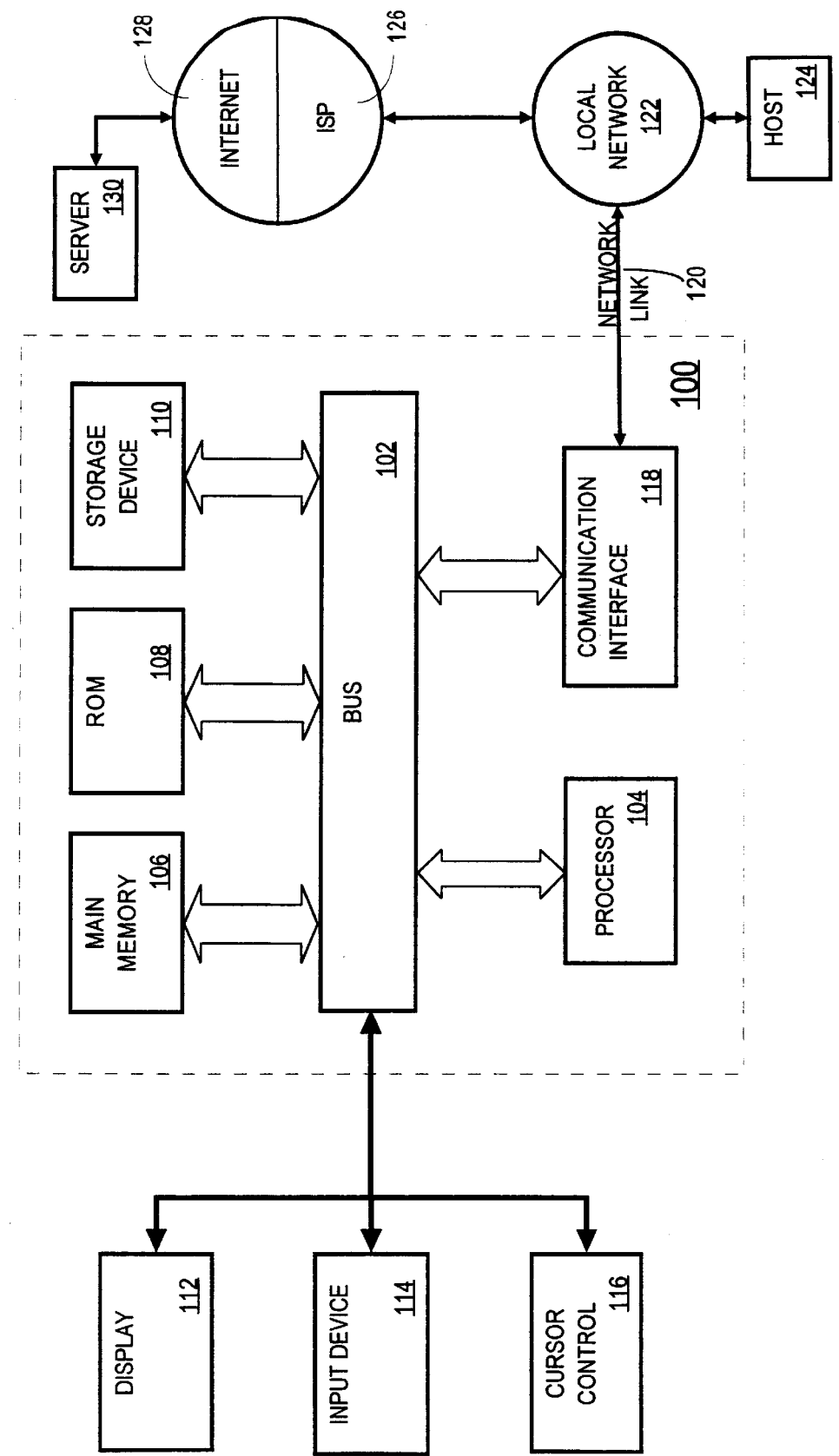
FIG. 1 depicts a computer system on which an embodiment of the present invention can be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for lightweight replication. According to one embodiment of the invention, lightweight replication is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for front office replication as described herein.

The received code may be executed by processor 104 as it is received, and/or stored in storage device 110, or other non-volatile storage for later execution. In this manner, computer system 100 may obtain application code in the form of a carrier wave.

Architectural Overview

Figure 2:
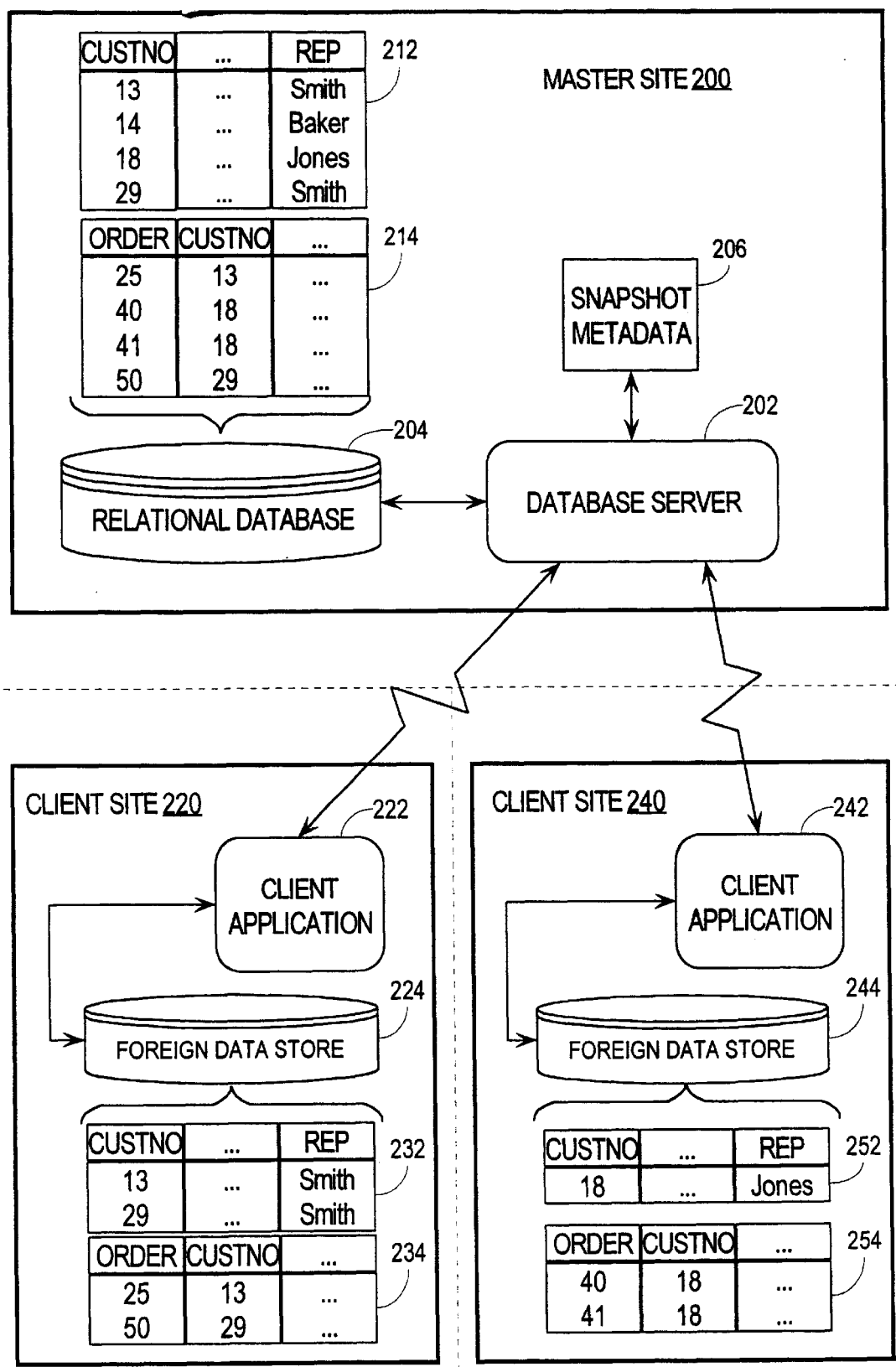
FIG. 2 is a schematic depiction of a snapshot replication environment in accordance with an embodiment.

FIG. 2 depicts an exemplary lightweight snapshot replication environment in accordance with one embodiment of the present invention for a company's sales department comprising a master site 200, client site 220, and client site 240. Master site 200, which may be a high-performance computer system at the company's headquarters, includes a relational database server 202 that is responsible for storing and retrieving data from a relational database 204. In this example, relational database 204 contains a customers master table 212 and an orders master table 214. The customers master table 212 is illustrative of the data stored in rows for each customer of the company and includes columns for the customer number CUSTNO and the sales representative REP to whom the customer is assigned. For example, customers 13 and 29 is assigned to sales representative Smith, and customer 18 is assigned to sales representative Jones. The orders master 214 illustrates the data stored in rows for each order that a customer makes and includes a column ORDER that indicates the number of the order and a CUSTNO column that is correlated to the customer in the customer masters table 212. For example, order 25 was placed by customer 13, and orders 40 and 41 were placed by customer 18.

In the illustrated embodiment, client site 220 and client site 240 are laptops that are temporarily connected to the master site 200 by a dial up line or the like, and belong to sales representatives Smith and Jones, respectively. In a front office automation environment, it is desirable for Smith to have a copy of Smith's customer information and a copy of the corresponding order information for those customers at Smith's laptop, i.e. client site 220, and for Jones to have a copy of Jones's customer and order information at Jones's laptop, i.e. client site 240.

Accordingly, client site 220 includes a front office client application 222, for example a thin application implemented in JAVA™ that manages a foreign data store 224 that contains snapshots of the customer master table 212 and the order master table 214 as customer snapshot 232 and order snapshot 234, respectively. Foreign data store 224 need not be a relational database and may be implemented by less sophisticated means. Since Smith is presumably only interested in Smith's own data, the customer snapshot 232 and order snapshot 234 only keep a subset of the data in the customer master table 212 and the order master table 214, respectively. Specifically, customer snapshot 232 contains the rows for Smith's customers and order snapshot 234 contains the corresponding order information. For example, customer snapshot 232 contains two rows for customers 13 and 29, and rows for orders 25 and 50 are kept in order snapshot 234. The information required to maintain and drive the refreshes for the local snapshots 232, 234, such as the defining queries for the snapshots 232, 234 and the latest refresh times, however, is kept at the master site 200 in snapshot metadata 206, although client site 220 maintains some metadata (not shown) identifying which snapshots are instantiated there, the refresh groups to which they belong, and the columns and column groups of each snapshot. Refresh groups and column groups are described in greater detail hereinafter.

Similarly, client site 240 includes a front office client application 242, such as a thin application implemented in JAVA™, that manages a foreign data store 244 that containing snapshots of the customer master table 212 and the order master table 214 as customer snapshot 252 and order snapshot 235, respectively. Foreign data store 244 need not be a relational database and may be implemented by less sophisticated means. Since Jones is only properly interested in Jones's own data, the customer snapshot 252 and order snapshot 254 only keep a subset of the data in the customer master table 212 and the order master table 214, respectively. Specifically, the customer snapshot 252 contains a row for Jones's customers (e.g. customer 18) and the order snapshot 254 contains the corresponding order information (e.g. orders 40 and 41). The information required to maintain and drive the refreshes for the local snapshots, such as the defining queries for the snapshots and the latest refresh times, however, is kept at the master site 200 in snapshot metadata 206, although client site 240 maintains some metadata identifying which snapshots are instantiated there, the refresh groups to which they belong, and the columns and column groups of each snapshot.

Snapshot Metadata Located at Master Site

Figure 3:
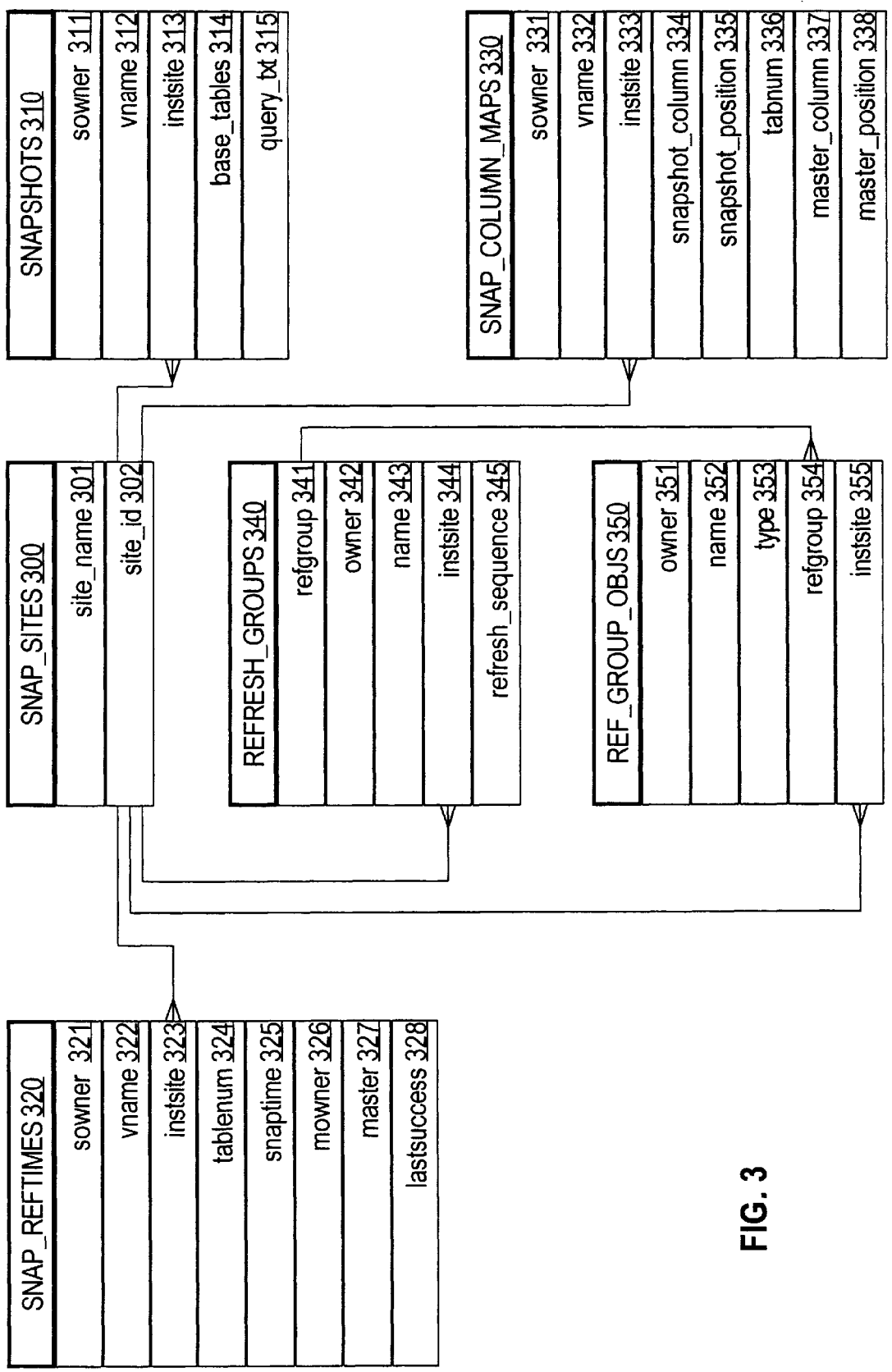
FIG. 3 illustrates snapshot metadata stored at a master site according to an embodiment.

Snapshot metadata 206 is stored at the master site 200 for supporting driving refreshes at the master site 200 of snapshots instantiated at client sites 220, 240. Some of the snapshot metadata 206 in accordance with one embodiment, is illustrated in FIG. 3 as a collection of data dictionary tables. The names for the data dictionary tables and their fields are supplied for ease of comprehension and need not reflect the actual name of any data dictionary table and their fields created at a master site 200 in any particular implementation.

Data dictionary table SNAP_SITES 300 is provided to maintain information about the various client sites at which the snapshots are instantiated. The site_name 301 of the data dictionary table SNAP_SITES 300 contains a user-friendly string for the name of the client site and must be unique within the replication environment. The site_id 302 contains a computer-friendly numeric identifier, which can be sequentially assigned and uniquely corresponds to each site_name 301. Each snapshot in this environment is identified by a key comprising the owner of the snapshot, the name of the snapshot, and the name of the snapshot.

Data dictionary table SNAPSHOT 310 holds the main metadata for all the snapshots managed by the master site 200. Sowner 311 contains the name of the owner of the snapshot, vname 312 contains the name of the snapshot, and instsite 313 contains the site identifier (correlated to site_id 302) of the snapshot, thereby uniquely identifying the snapshot. An instsite 313 value of 0 identifies a server-side snapshot, as in the high-end implementation of snapshot replication. Two other pieces of metadata are illustrated in data dictionary table SNAPSHOTS 310, base_tables 314, which indicates the master tables, views, or other database objects that are used for the snapshot, and query_txt 315 containing the definition query for the snapshot.

Data dictionary table SNAP_REFTIMES 320 maintains the refresh timestamps for each master table of a snapshot. Sowner 321 contains the name of the owner of the snapshot, vname 322 contains the name of the snapshot, and instsite 323 contains the site identifier (correlated to site_id 302) of the snapshot, thereby uniquely identifying the snapshot. An instsite 323 value of 0 identifies a server-side snapshot, as in the high-end implementation of snapshot replication. Snaptime 325 identifies the last time the master table was involved in a refresh. The tablenum 324 is a numeric identifier for the master table, mowner 326 identifies the owner of the master table, and master 327 contains the name of the master table. Lastsuccess 328 indicates the last, verified successful refresh time for a snapshot.

Data dictionary table SNAP_COLUMN_MAPS 330 stores information about the aliasing of the snapshot columns with the master table columns. Sowner 331 contains the name of the owner of the snapshot, vname 332 contains the name of the snapshot, and instsite 333 contains the site identifier (correlated to site_id 302) of the snapshot, thereby uniquely identifying the snapshot. An instsite 333 value of 0 identifies a server-side snapshot, as in the high-end implementation of snapshot replication. Snapshot_column 334 contains the name of the snapshot column and snapshot_position 335 identifies the position of the column in the snapshot. Likewise, for the corresponding columns of the master table (identified by tabnum 336), master_column 337 contains the name of the snapshot column and snapshot_position 338 identifies the position of the column in the snapshot.

Since the snapshot metadata 206 for refreshing snapshots is stored at the master site 200, the master database server 200 has all the information for driving the refresh at its own site, without needing to confer with a client site to reconcile the difference between the master tables 212, 214 and the snapshots 232, 234, avoiding almost all of the round trip RPCs for refreshing snapshots in the high-end implementation. Consequently, the bandwidth requirements of the network connection are significantly reduced, enabling the use of dial up lines and the like at acceptable levels of performance.

Refresh Groups

The use of refresh groups stems from the realization that a laptop user normally expects to refresh all the snapshots used by a suite of front office automation software at the same time. A refresh group is a collection of related snapshots that are refreshed at the same time. For example, the various snapshots of a front office application suite can be placed in the same refresh group, to allow them all to be refreshed at the same time.

Accordingly, snapshot metadata 206 also stores metadata to maintain refresh groups. With continued reference to FIG. 3, data dictionary table REFRESH_GROUPS 350 holds the metadata for the each refresh group defined at the master site 200. Refgroup 351 contains a number identifying the refresh group, owner 352 identifies the owner of the refresh group, and name 353 is a string storing user-friendly name of the refresh group. Instsite 333 contains an identifier (correlated to site_id 302) of the site at which the refresh group is instantiated.

Data dictionary table REF_GROUP_OBJECTS 350 tracks the objects defined for a refresh group. Each object in the refresh group, for example a snapshot, is identified by a key comprising owner 351 for the name of the owner of the snapshot, name 352 for the name of the object, and insite 355 for the site identifier (correlated to site_id 302) of the snapshot, thereby uniquely identifying the snapshot. An instsite 355 value of 0, of course, identifies a server-side refresh group object, an improvement compatible with the high-end implementation of snapshot replication. Type 353 indicates the type of the refresh group object and defaults to "snapshot." Refgroup 354 is correlated with refgroup 341 to identify the refresh group for with the object defined.

Since refresh groups collect related snapshots at a client site, provision of refresh groups, therefore, allows the multiplicity of separate RPC calls for each snapshot and master table to be combined into a single snapshot refresh request, thereby further reducing the bandwidth requirements for the connection between the master site 200 and the client site 220. For example, if 200 snapshots of a front office application suite are placed in the same refresh group, then the client site 220 needs only make a single refresh request to the master site 200 to refresh all 200 snapshots.

Refreshing Snapshots

Without refreshing snapshots over time become out-of-date. Therefore, at some point in time, a sales representative will want to refresh the snapshots 232, 234 to bring them up to date. In addition, if the snapshots 232, 234 have been installed as updatable snapshots, the sales representative may have changes such as new customer orders to be uploaded to the master site 200. Accordingly, the sales representative would connect the laptop 220 to the master site 200, for example by a dial up telephone line or the like, and request to update the snapshots 232, 234 on the laptop 220.

Figure 4:
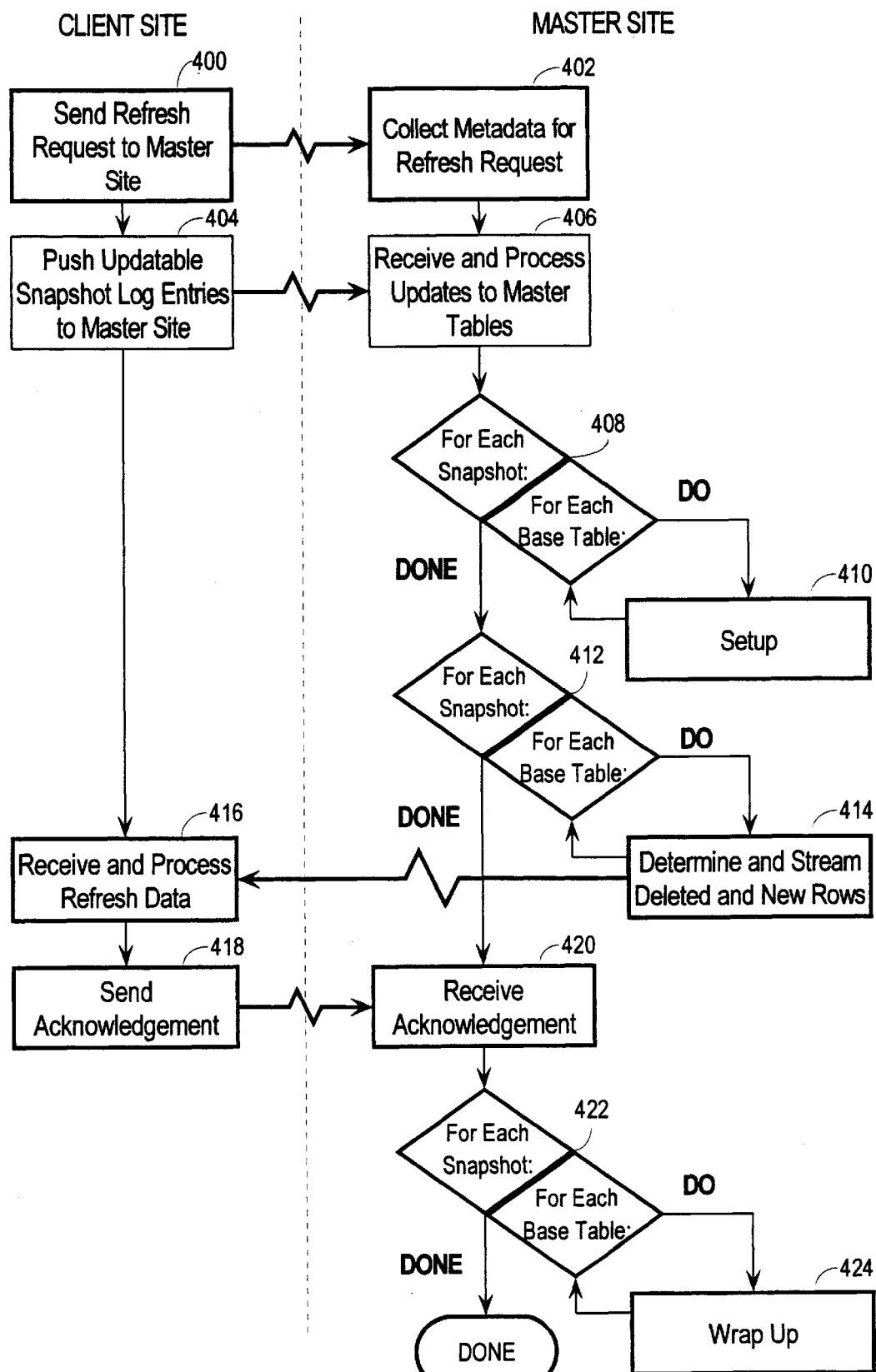
FIG. 4 is a flowchart for refreshing a group of snapshots for an embodiment.

FIG. 4 is a flowchart showing a fast refresh of snapshots 232, 234 on laptop client site 220 in accordance with an embodiment. At step 400, the sales representative connects by giving a login name and password and sends a refresh request to the master site 200, identifying the refresh group to be brought up-to-date and including a refresh sequence number that serves as an acknowledgement that the last refresh was successfully performed. At step 402, the master database server 202 collects the snapshot metadata 206 to process the refresh request.

If the local snapshots are updatable and updates have been indeed been made to the updatable snapshots, the queued updates are pushed to the master site 200 from the locally maintained update snapshot logs and the corresponding locally inserted entries in the snapshots are deleted (step 404). The master database server 202, in response, receives the updates, stores them in a temporary table (whose lifetime is that of a database session while the client site 220 is connected to the master site 200), and applies the updates to the master tables (step 406).

At this point, refreshing the snapshots 232, 234 in the specified refresh group is driven entirely at the master site 200, iterating through doubly nested loops over each snapshot 232, 234 and its master tables 212, 214, to reconcile their differences with the snapshots 232, 234 without incurring numerous round trip RPCs between the master site 200 and the client site 202. In the doubly nested loop controlled by step 408, the master database server 202 repeatedly performs the set up operation (step 410). The set up operation, which is used when there are multiple snapshots 232, 252 defined for the same table 212, processes the master log files corresponding to the master tables 212, 214 to set the refresh time of the most recently added changes to the master tables 212, 214 in the master logs to the current refresh time.

In the doubly nested loop controlled by step 412, the master database server 202 formulates SQL select statements based on the snapshot metadata 206 and executes the SQL select statements on the relational database 204, first to determine the deleted rows and then to determine the new rows that updated or inserted. These rows are streamed to the client application 222 at the client site (step 414), preferably by a lightweight row transfer protocol described hereinafter. In response, the client application 222 receives and processes the refresh data in step 416. If the changes are successfully applied, the client application 222 sends an acknowledgement in step 418. In response to receiving the acknowledgement, by the master database server 202 commits the changes to the master logs response (step 420).

Finally, in the doubly nested loop controlled by step 422, the master database server 202 performs the wrap up operation (step 424). The wrap up operation, also used when there are multiple snapshots defined for the same table, purges the master logs of the entries that are older than the least recently refreshed snapshot to prevent the master logs from growing unacceptably large.

It is therefore evident that driving the snapshot refresh at the master site in accordance with an aspect of the invention dramatically reduces the number of round trip RPCs. For example, to refresh a refresh group containing 200 snapshots each using two master tables, the high-end approach required at least 1600 RPCs, but the corresponding master-driven snapshot refresh uses only one round-trip RPCs, to send the refresh request in step 400 and get back the data in step 416.

Lightweight Communication

In accordance with yet another aspect, a lightweight communication protocol is employed in transferring the bulk of the data between the master site 200 and the client site 220 in refreshing the snapshots. Referring back to FIG. 4, such a lightweight protocol may be employed in transferring the updatable snapshot log entries from the client site 220 at step 404 to the master site 200 at step 406 (the "push" direction) and the deleted and new rows from the master site 200 at step 414 to the client site 220 at step 416 (the "refresh" direction).

Figure 5:
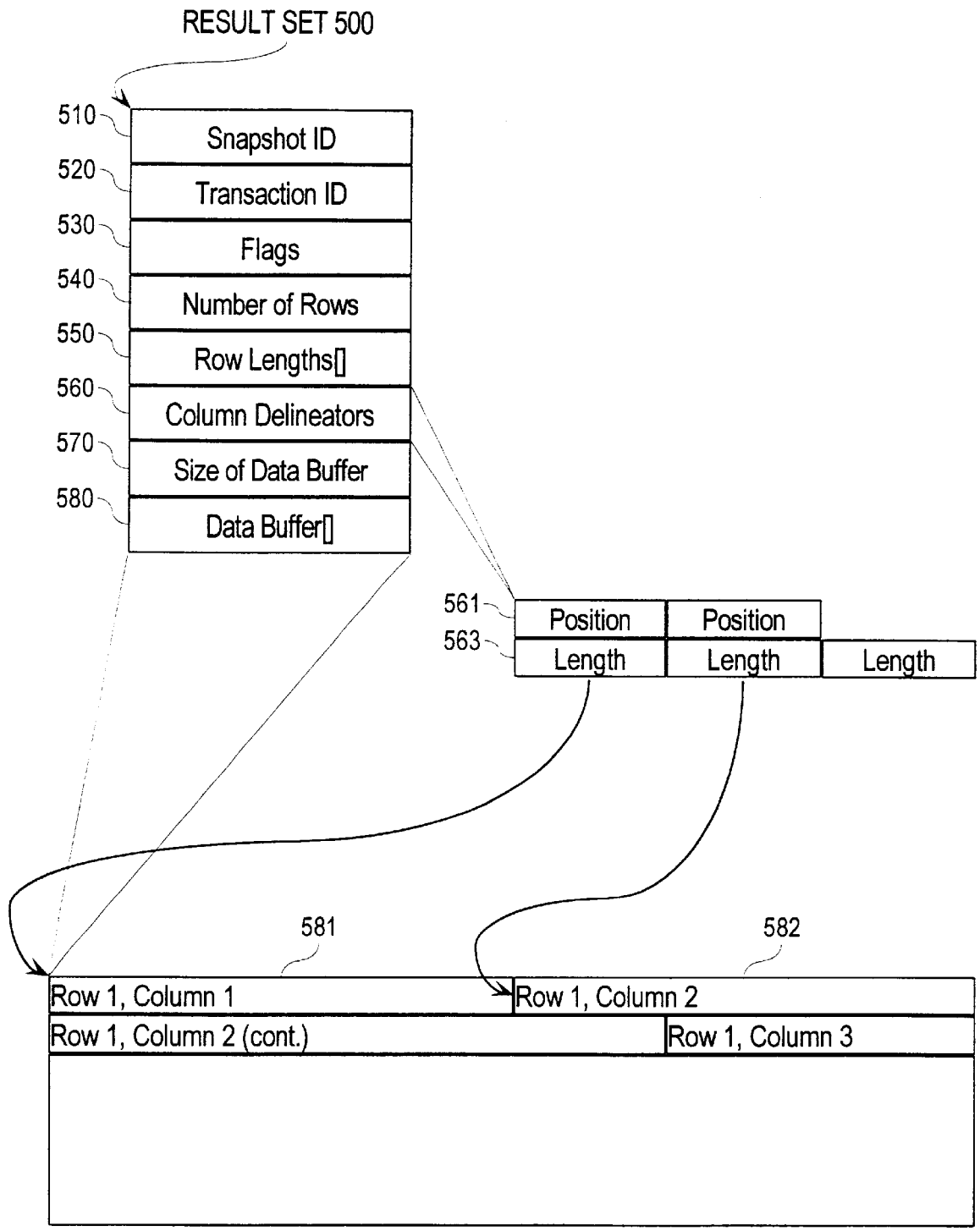
FIG. 5 is a schematic depiction of a result set in accordance with a row transfer protocol of an embodiment.

More specifically, such a lightweight communication employs a thin protocol that specifies that one or more rows of data in propagating changes between a snapshot and a master table are grouped together into a "result set." FIG. 5 depicts one implementation of a result set 500, in which the bytes that constitute the data for the rows are bundled into a data buffer 580, whose size is given by data buffer size 570. The delineation of those bytes into rows and columns are governed by flags 530, the number of rows field 540, the row lengths array 550, and the column delineator structure 560. The column delineator structure 560 includes a position indicator 561 and a column length array 563.

The meaning and presence of some of these header fields are context dependent, as described hereinafter, depending on whether the result set is used in the "refresh direction" (from master site 200 to client site 220) or in the "push direction" (from client site 220 to master site 200). However, one of the flags 530, indicating whether or not the sizes for the column lengths are normalized, is used in both directions.

A "normalized column length size" refers to a number of bytes in which the lengths of all the column data in the result set 500. For example, if the longest length of the column data is 120 bytes, then the normalized column length size would be 1, because all the column lengths can fit in one signed byte. As another example, if the longest column data length is 70,000 then at least three bytes is required to hold all of the column lengths.

Figure 6A:
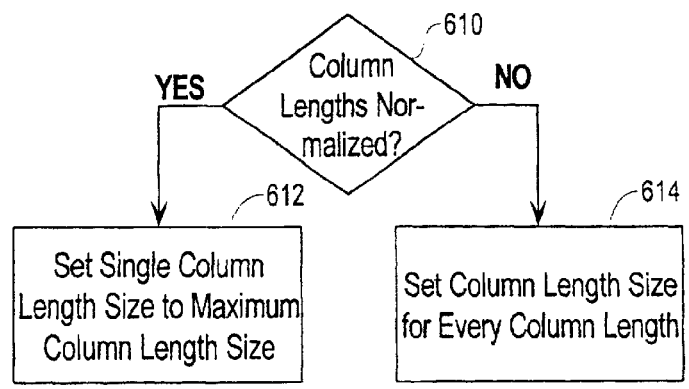
FIGS. 6(a), 6(b), and 6(c) are flowcharts for packaging the result set.

Accordingly, as shown in FIG. 6(a), the sending site (either master site 200 in the refresh direction or client site 220 in the push direction) determines whether the column lengths should be normalized, for example, by checking the maximum column lengths of all the fields (step 610). If, for example, the maximum column length can fit in two bytes because there is no LOB data, then the normalized column bit in the flags 530 is set and a single column length size, for example a 2 in the first entry of the column length array 563, is set to the maximum column length (step 612). If, on the other hand, column lengths should not be normalized, then the column length size is set as a prefix before every column length in the column length array 563.

Figure 7A:
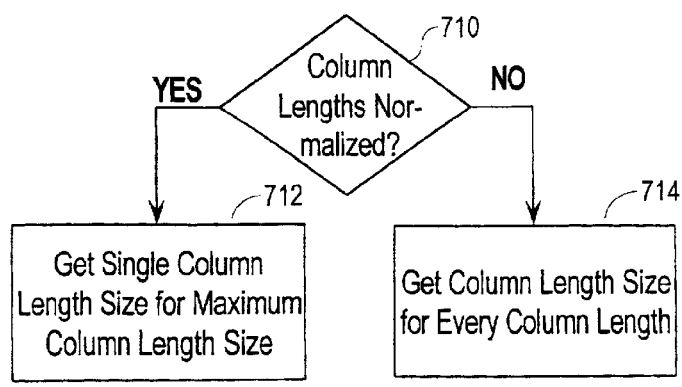
FIGS. 7(a), 7(b), and 7(c) are flowcharts for unpacking the result set.

At the receiving site, shown in FIG. 7(a), the process is reversed where the flags 530 is checked to determine whether the sizes of the column lengths are normalized (step 710). If the sizes of the column lengths are normalized, then a single column length size, for example the first entry in the of the column length array 563, is used (step 712). For example, if the first entry is a 2, then every two byte sequence remaining in the of the column length array 563 is fetched as a column length. If, on the other hand, the column length sizes are not normalized, then the column length size is fetched as a prefix before every column length in the column length array 563.

In both the refresh direction and the push direction, the flags 530 header field also indicates whether the result set 500 has been broken up into a plurality of separate message, and, if so, which message is the last one for the current result set 500. These flags allow the result set 530 to be transmitted at a buffer size, e.g. 4K, that is efficient for the particular connection between the master site 200 and the client site 220.

The number of rows 540 in the result set 500 header specifies the number of rows that presently encapsulated in the particular result set 500. The following field is an array of row lengths 550, which contains the length of each row in result set 500.

The data buffer size field 570 indicates the size of all the row data in the data buffer 580 to be transferred. The row data is stored in the data buffer 580 end-to-end, and the start of each row is governed by the row lengths array 550 and the start of each column is governed by the column delineators array 560.

Lightweight Communication in the Refresh Direction

Lightweight communication in the refresh direction refers to the streaming of row data from the master site 200 to the client site 220. The flags 530 for this direction further indicates whether the rows contained in the result set 500 are rows to be deleted in the snapshot, rows to be inserted into snapshot, or rows to be "upserted" in the snapshot (updated if present, else inserted). Other values of the flags header field 530 in the refresh direction indicate whether the result set 500 is being transmitted for a inner table (e.g. customers master table 212 for the orders snapshot 234) or the outer table (e.g. the orders master table 214 for the orders snapshot 234). The inner and outer table flags are set if a snapshot defined by a subquery is being processed, because the refresh data for the inner table include additional information to correlate the inner table rows to the outer table rows. Subquery snapshots are described in the commonly assigned U.S. patent application Ser. No. 08/880,928, entitled "Fast Refresh of Snapshots Containing Subqueries" filed on Jun. 23, 1997 by Alan Downing et al., the entire contents of which of are hereby incorporated by reference herein.

The position array 561 is used differently depending on the value of the operation type. If the operation type is insert or upsert, potentially the entire row will be needed and therefore every column is sent. Accordingly, the position array 561 is set for all the columns in the snapshot. On the other hand, for a delete operation all such columns are unnecessary; thus, only the key columns are sent, with the position array 561 set to indicate that fact. For example, if only columns 2 and 3 are sent, then the position array 561 would have a 2 and a 3.

Figure 6B:
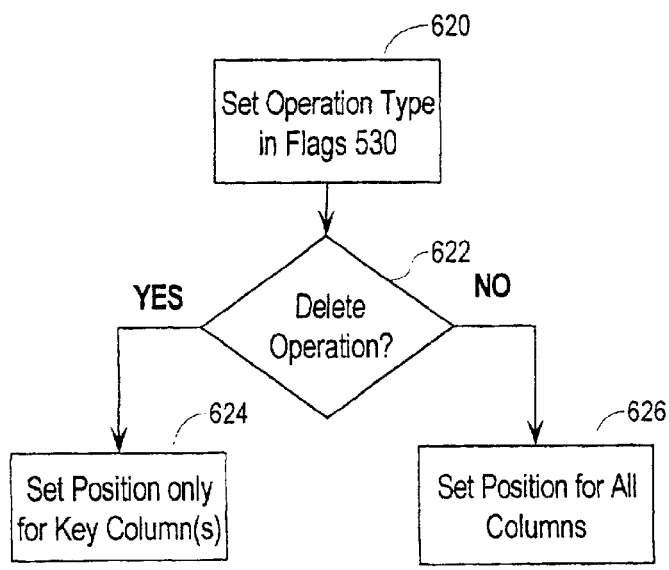
Figure 7B:
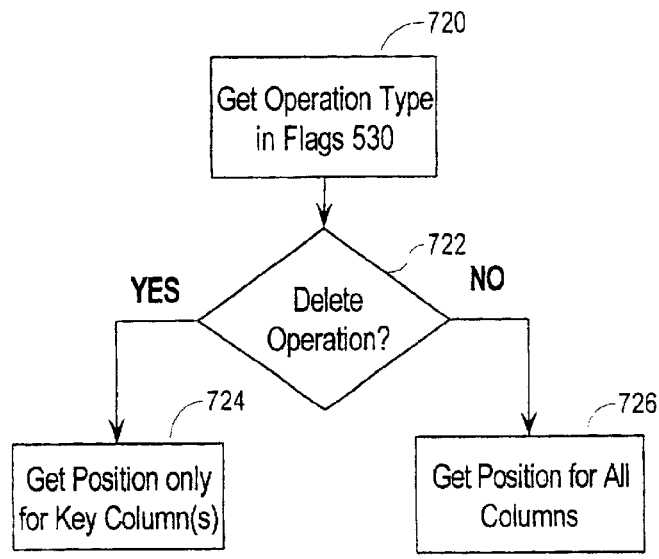

Consequently, the sending site operates as shown in FIG. 6(b), where the operation type (delete, insert, upsert) is set in the flags 530 (step 620). If the operation is a delete (step 622), then the position array 561 is set only for the key columns (step 624), but for the insert and upsert operations, the positions for all the columns are set (step 626). In the other direction, shown in FIG. 7(b), the receiving site checks the operation type in flags 530 (step 720). If the operation is a delete (step 722), then the position array 561 is fetched only for the key columns (step 724), but for the insert and upsert operations, the positions for all the columns are fetched from the position array 561 (step 626).

Lightweight Communication in the Push Direction

In the push direction, the flags header field 530 indicates whether the result set is for a normal deferred transaction, whether the result set is for an error transaction (which occurs if a deferred transaction encountered an error and the master database server 502 requests the same row data to be pushed up again) or whether the result is "re-pushed". A re-push occurs when a client had previously only pushed the local updates, but decided not to refresh the local snapshot. In the case of a re-push, only the primary keys (old and new) are sent.

Since conflict resolution at the master site 500 uses both the old and new values for the column values in the push direction, it is desirable to reduce the amount of data being sent for conflict resolution. Thus, one of embodiment of the invention employs the techniques described in U.S. patent application Ser. No. 09/081,297 entitled "Method for Data Replication with Conflict Detection" filed on May 20, 1998 by James Stamos et al., the whole contents of which are incorporated by reference herein, in which the columns are partitioned into column groups, new and old values for unmodified column groups are not sent, and either of the new and old values for unmodified columns in a modified column group are not sent.

In contrast with the refresh direction, the result set 500 is not batched based on operation type. Rather the different rows of the result set are sent in the sequence in which the corresponding changes were made. Further the updatable snapshot queue contains updates for every snapshot at a particular master, regardless of the refresh group. Consequently, each row in the updatable snapshot queue includes a snapshot identifier for the updated snapshot, a DML type (insert, update, and delete) to indicate the operation, and a column changed vector to indicate which columns have changed. This information is included in the row data as columns with negative positions. For example, position −3 may be the snapshot identifier, position −2 the DML type, and position −1 the change vector.

Since the rows may be from different snapshots, the position array 561 explicitly contains entries for every row. For insert and delete DML operations, the position array 561 skips over zero-length rows, general key columns, changed columns, columns required for conflict resolution, and columns needed by a trigger at the master site. For the update DML operation, however, the position array 561 includes a position for all the old column even if zero-length, and for at least one new column.

Figure 6C:
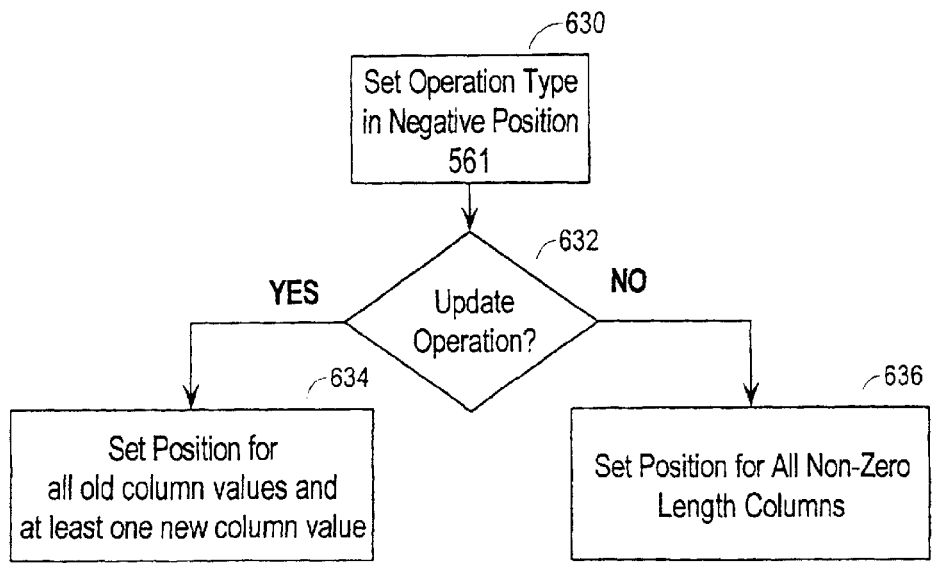
Figure 7C:
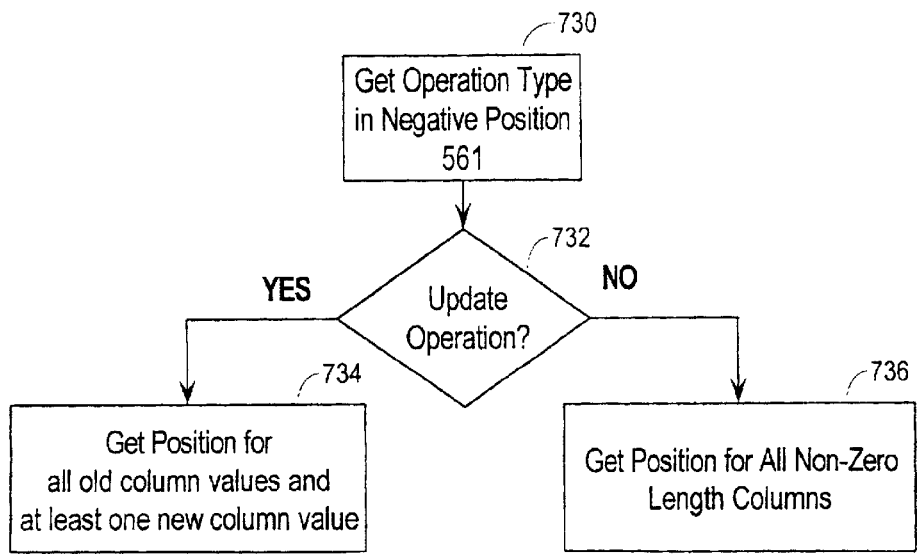

Consequently, the sending site operates as shown in FIG. 6(c), where the DML type (delete, insert, udpate) is set in the position array 561 with a negative position value, such as −2 (step 630). If the operation is an update (step 632), then the position array 561 is set for the positions of all the old column values, followed by the position of at least one new column, thereby introducing a repeated position number (step 634). For the other operations, however, the positions for all the columns are set, except for those column that are zero-length (step 636). In the other direction, shown in FIG. 7(c), the receiving site checks the operation type in the position array 561 entry with a negative position (step 730). If the operation is an update (step 722), then the position array 561 is fetched the all old column values and at least one new column value, identified by a repeated position (step 734). For the insert and delete operations, however, the positions for the columns are fetched from the position array 561, wherein skipped columns are considered to be zero-length (step 736).

The above-described approach does not require the client site to implement SQL or PL/SQL, an extension to SQL available from Oracle Corp., of Redwood Shores, Calif. As a result, the client site laptop can be installed with thin clients, such as JAVA™ applications using CORBA, because the lightweight communication protocol requires much less computing resources than a thick SQL or PL/SQL protocol.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

For example, although the present invention has been extensive described with respect to the refreshing snapshots for front office automation, it is to be understood that the same techniques disclosed herein are readily applicable to refreshing snapshots in a high-end snapshot replication implementation, with peer-to-peer asynchronous replication, and even with the publish-subscribe model of data replication.

What is claimed is:

1. A method of encapsulating and transmitting data for a plurality of rows organized in columns associated with respective column numbers, comprising the steps of:

encapsulating the plurality of rows into one or more result sets, each of said result sets comprising:
   a column length array, wherein each element of the column length array has a value that indicates a length of the data within the rows for at least one column, and
   a column position indicator array, wherein a column number stored in the column position indicator array identifies by number an associated column of the data that correspond to the column lengths;

storing a negative number in the column position indicator array for one of a snapshot identifier, a Data Manipulation Language (DML) type of an operation, and a column change vector; and transmitting the one or more result sets.

2. The method of claim 1, wherein the step of encapsulating the plurality of rows into one or more result sets includes the step of:
   formatting the data for the rows end-to-end in a data buffer within each of the result sets.

3. The method of claim 1, wherein the step of encapsulating the plurality of rows into one or more result sets includes the step of:
   setting a single column size value in each of the result sets, indicating a fixed size of entries in the column length array.

4. The method of claim 1, wherein the step of encapsulating the plurality of rows into one or more result sets includes the step of:
   setting a column size value for each entry in the column length array.

5. The method of claim 1, wherein the step of encapsulating the plurality of rows into one or more result sets includes the step of setting a flag in one of the result sets indicating one of:

(a) that a first entry of the column length array holds a column size value indicating a fixed-size of remaining entries in the column length array, said remaining entries in the column length array representing the respective lengths of data contained in respective columns of the row; and (b) that each entry in the column length array includes a size of column length data.

6. The method of claim 1, wherein the step of encapsulating the plurality of rows into one or more result sets includes the step of:
   setting column numbers in the column position indicator array for respective columns having a corresponding entry in the column length array.

7. The method of claim 6, wherein the step of setting the column numbers includes the step of setting the column numbers for a single row of the rows.

8. The method of claim 6, wherein the step of encapsulating the plurality of rows into one or more result sets further includes the steps of:
   setting an operation flag in one of the result sets to indicate a delete operation; and
   setting the column numbers only for respective key columns.

9. The method of claim 6, wherein the step of setting the column numbers includes the step of:
   setting the column numbers within one of the result sets only for columns having a corresponding entry in a column length array having a non-zero length.

10. The method of claim 1, further comprising the steps of:
   setting a negative number stored in the column position indicator array to indicate an update operation;
   setting positive numbers stored in the column position indicator array for every column in a row to indicate a length of old column data; and
   repeating at least one number stored in the column position indicator array for a new column in the row.

11. The method of claim 1, wherein the step of encapsulating the plurality of rows into one or more result sets includes the step of:
   allocating less than a predetermined buffer size to hold the data for the rows among a plurality of the result sets.

12. A method of receiving and unpacking data for a plurality of rows organized in columns associated with respective column numbers, comprising the steps of:

receiving one or more result sets, each of said one or more result sets comprising:
   a column length array, wherein each element of the column length array has a value that indicates a length of the data within the rows for at least one column, and
   a column position indicator array, wherein a column number stored in the column position indicator array identifies by number an associated column of the data that correspond to the column lengths;

accessing a negative number stored in the column position indicator array to indicate one of a snapshot identifier, a Data Manipulation Language (DML) type of an operation, and column change vector; and unpacking the one or more result sets into the data for the rows.

13. The method of claim 12, wherein the step of unpacking the one or more result sets into the data for the rows includes the step of:

extracting the data for the rows end-to-end in a data buffer within each of the result sets.

14. The method of claim 12, wherein the step of unpacking the one or more result sets into the data for the rows includes the step of:

accessing a single column size value in each of the result sets, indicating a fixed size of entries in the column length array.

15. The method of claim 12, wherein the step of unpacking the one or more result sets into the data for the rows includes the step of:

accessing a column size value for each entry in the column length array.

16. The method of claim 12, wherein the step of unpacking the one or more result sets into the data for the rows includes the step of accessing a flag in one of the result sets indicating one of:

(a) that a first entry of the column length array holds a column size value indicating a fixed-size of remaining entries in the column length array, said remaining entries in the column length array representing the respective lengths of data contained in respective columns of the row; and (b) that each entry in the column length array includes a size of column length data.

17. The method of claim 12, wherein the step of unpacking the one or more result sets into the data for the rows includes the step of:

accessing column numbers stored in the column position indicator array for columns having a corresponding entry in the column length array.

18. The method of claim 17, wherein the step of accessing the column numbers includes the step of accessing the column numbers for a single row of the rows.

19. The method of claim 17, wherein the step of unpacking the one or more result sets into the data for the rows further includes the steps of:

accessing an operation flag in one of the result sets to indicate a delete operation; and accessing column numbers for key columns.

20. The method of claim 17, wherein the step of wherein the step of accessing the column numbers includes the step of:

accessing column numbers for columns having a corresponding entry in a column length array having a non-zero length.

21. The method of claim 12, further comprising the steps of:

accessing a negative number stored in the column position indicator array to indicate an update operation;

accessing positive numbers stored in the column position indicator array for every column in a row to indicate a length of old column data; and accessing at least one number stored in the column position indicator array repeated to indicate a length of a new column in the row.

22. The method of claim 12, wherein the step of unpacking the one or more result sets into the data for the rows the step of:

combining a plurality of the result sets having at most a predetermined buffer size for holding the data for the rows.

23. A computer-readable medium bearing instructions for encapsulating and transmitting data, said instructions arranged, when executed by one or more processors, to cause the one or more processors to perform the steps of the method according to claim 1.

24. A computer-readable medium bearing instructions for receiving and unpacking data, said instructions arranged, when executed by one or more processors, to cause the one or more processors to perform the steps of the method according to claim 12.

25. A method of encapsulating and transmitting data for a plurality of rows organized in columns, comprising the steps of:

encapsulating the plurality of rows into one or more result sets, each of said result sets comprising:

a column length array, wherein at least one element of the column length array indicates a length of the data within the rows for one or more of the columns, wherein the column length array indicates fewer lengths of the data than a total number of the columns, and a plurality of column position indicators, wherein one of the column position indicators corresponds to the at least one element and identifies one of the one or more columns; and transmitting the one or more result sets.

26. The method of claim 25, wherein the step of encapsulating the plurality of rows into one or more result sets includes the step of:

formatting the data for the rows end-to-end in a data buffer within each of the result sets.

27. The method of claim 25, wherein the step of encapsulating the plurality of rows into one or more result sets includes the step of:

setting a single column size value in each of the result sets, indicating a fixed size of entries in the column length array.

28. The method of claim 25, wherein the step of encapsulating the plurality of rows into one or more result sets includes the step of:

setting a column size value for each entry in the column length array.

29. The method of claim 25, wherein the step of encapsulating the plurality of rows into one or more result sets includes the step of setting a flag in one of the result sets indicating one of:

(a) that a first entry of the column length array holds a column size value indicating a fixed-size of remaining entries in the column length array, said remaining entries in the column length array representing the respective lengths of data contained in respective columns of the row; and (b) that each entry in the column length array includes a size of column length data.

30. The method of claim 25, wherein the step of encapsulating the plurality of rows into one or more result sets includes the step of:

setting column numbers in the plurality of column position indicators for respective columns having a corresponding entry in the column length array.

31. The method of claim 30, wherein the step of setting the column numbers includes the step of setting the column numbers for a single row of the rows.

32. The method of claim 30, wherein the step of encapsulating the plurality of rows into one or more result sets further includes the steps of:

setting an operation flag in one of the result sets to indicate a delete operation; and setting the column numbers only for respective key columns.

33. The method of claim 30, wherein the step of setting the column numbers includes the step of:

setting the column numbers within one of the result sets only for columns having a corresponding entry in the column length array having a non-zero length.

34. The method of claim 30, further comprising the step of storing a negative number in the plurality of column position indicators for one of a snapshot identifier, a Data Manipulation Language (DML) type of an operation, and a column change vector.

35. The method of claim 34, further comprising the steps of:

setting a negative number stored in the plurality of column position indicators to indicate an update operation;

setting positive numbers stored in the plurality of column position indicators for every column in a row to indicate a length of old column data; and repeating at least one number stored in the plurality of column position indicators for a new column in the row.

36. The method of claim 25, wherein the step of encapsulating the plurality of rows into one or more result sets includes the step of:

allocating less than a predetermined buffer size to hold the data for the rows among a plurality of the result sets.

37. A method of receiving and unpacking data for a plurality of rows organized in columns, comprising the steps of:

receiving one or more result sets, each of said result sets comprising:

a column length array, wherein at least one element of the column length array indicates a length of the data within the rows for one or more of the columns, wherein the column length array indicates fewer lengths of the data than a total number of the columns, and a plurality of column position indicators, wherein one of the column position indicators corresponds to the at least one element and identifies one of the one or more columns; and unpacking the one or more result sets into the data for the rows.

38. The method of claim 37, wherein the step of unpacking the one or more result sets into the data for the rows includes the step of:

extracting the data for the rows end-to-end in a data buffer within each of the result sets.

39. The method of claim 37, wherein the step of unpacking the one or more result sets into the data for the rows includes the step of:

accessing a single column size value in each of the result sets, indicating a fixed size of entries in the column length array.

40. The method of claim 37, wherein the step of unpacking the one or more result sets into the data for the rows includes the step of:

accessing a column size value for each entry in the column length array.

41. The method of claim 37, wherein the step of unpacking the one or more result sets into the data for the rows includes the step of accessing a flag in one of the result sets indicating one of:

(a) that a first entry of the column length array holds a column size value indicating a fixed-size of remaining entries in the column length array, said remaining entries in the column length array representing the respective lengths of data contained in respective columns of the row; and (b) that each entry in the column length array includes a size of column length data.

42. The method of claim 37, wherein the step of unpacking the one or more result sets into the data for the rows includes the step of:

accessing column numbers stored in the plurality of column position indicators for columns having a corresponding entry in the column length array.

43. The method of claim 42, wherein the step of accessing the column numbers includes the step of accessing the column numbers for a single row of the rows.

44. The method of claim 42, wherein the step of unpacking the one or more result sets into the data for the rows further includes the steps of:

accessing an operation flag in one of the result sets to indicate a delete operation; and accessing column numbers for key columns.

45. The method of claim 42, wherein the step of accessing the column numbers includes the step of:

accessing the column numbers only for columns having a corresponding entry in the column length array having a non-zero length.

46. The method of claim 42, further comprising the step of accessing a negative number stored in the plurality of column position indicators to indicate one of a snapshot identifier, a Data Manipulation Language (DML) type of an operation, and a column change vector.

47. The method of claim 46, further comprising the steps of:

accessing a negative number stored in the plurality of column position indicators to indicate an update operation;

accessing positive numbers stored in the plurality of column position indicators for every column in a row to indicate a length of old column data; and accessing at least one number stored in the plurality of column position indicators repeated to indicate a length of new column in the row.

48. The method of claim 37, wherein the step of unpacking the one or more result sets into the data for the rows includes the step of:

combining a plurality of the result sets having at most a predetermined buffer size for holding the data for the rows.

49. A computer-readable medium bearing instructions for encapsulating and transmitting data, said instructions arranged, when executed by one or more processors, to cause the one or more processors to perform the steps of the method according to claim 25.

50. A computer-readable medium bearing instructions for receiving and unpacking data, said instructions arranged, when executed by one or more processors, to cause the one or more processors to perform the steps of the method according to claim 37.

* * * * *

UNITED STATES PATENT AND TRADEMARK OFFICE
CERTIFICATE OF CORRECTION

PATENT NO. : 6,847,971 B1  
DATED : January 25, 2005  
INVENTOR(S) : Balarman et al.

It is certified that error appears in the above-identified patent and that said Letters Patent is hereby corrected as shown below:

Title page,
Item [56], References Cited, U.S. PATENT DOCUMENTS, add the following:

```
-- 5,418,966    05/1995    Madduri
   5,440,735    08/1995    Goldring
   5,452,448    09/1995    Sakurabe et al.
   5,553,279    09/1996    Goldring
   5,613,113    03/1997    Goldring
   5,706,509    01/1998    Man-Hak Tso
   5,870,759    02/1999    Bauer et al.
   5,870,765    02/1999    Bauer et al.
   5,926,816    07/1999    Bauer et al.
   6,272,502    08/2001    Lieuwen et al.
   6,289,335    09/2001    Downing et al. --
```

Signed and Sealed this

Twenty-eighth Day of June, 2005

JON W. DUDAS  
*Director of the United States Patent and Trademark Office*